(12) United States Patent
King et al.

(10) Patent No.: US 6,543,177 B1
(45) Date of Patent: Apr. 8, 2003

(54) ACOUSTICALLY VISIBLE FISHING NET

(75) Inventors: Donald P. King, Gloucester, MA (US); Norman L. Holy, Yardley, PA (US)

(73) Assignee: Atlantic Gillnet Supply, Inc., Gloucester, MA (US)

(*) Notice: Subject to any disclaimer, the term of this patent is extended or adjusted under 35 U.S.C. 154(b) by 0 days.

(21) Appl. No.: 09/276,722

(22) Filed: Mar. 26, 1999

(51) Int. Cl.[7] ................. A01K 71/00; A01K 73/00; A01K 79/00
(52) U.S. Cl. ............... 43/4.5; 43/7; 43/17.1; 43/9.95
(58) Field of Search ............. 43/7, 4.5, 9.95, 43/17.1

(56) References Cited

U.S. PATENT DOCUMENTS 4,945,520 A * 7/1990 Ford .................. 43/4.5

FOREIGN PATENT DOCUMENTS

| JP | 360066930 | * | 4/1985 | 43/7 |
|---|---|---|---|---|
| JP | 360094046 | * | 5/1985 | 43/7 |
| JP | 0000613 | * | 1/1986 | 43/7 |
| JP | 1260821 | * | 11/1986 | 43/7 |
| JP | 2036128 | * | 2/1987 | 43/7 |
| JP | 0239934 | * | 10/1987 | 43/7 |
| JP | 362289131 | * | 12/1987 | 43/7 |
| JP | 3137629 | * | 6/1988 | 43/7 |
| JP | 1213410 | * | 8/1989 | 43/7 |
| JP | 1246411 | * | 10/1989 | 43/7 |
| JP | 403056560 | * | 3/1991 | 43/7 |
| JP | 3076813 | * | 4/1991 | 43/7 |
| JP | 0061936 | * | 7/1992 | 43/7 |
| JP | 404190730 | * | 7/1992 | 43/7 |

* cited by examiner

*Primary Examiner*—Kurt Rowan
(74) *Attorney, Agent, or Firm*—Birch, Stewart, Kolasch, & Birch, LLP.

(57) ABSTRACT

Thermoplastic resin compositions are provided that possess improved acoustic reflectivity. The compositions are useful in preparing acoustically reflective fishing nets that can be used in a method of fishing to avoid the unwanted capture of cetaceans.

10 Claims, 2 Drawing Sheets

ACOUSTICALLY VISIBLE FISHING NET

FIELD OF THE INVENTION

The present invention is directed to the manufacture of a fishing net made of acoustically visible material to cetaceans, thereby preventing the incidental capture of cetaceans in the netting.

BACKGROUND OF THE INVENTION

The inadvertent capture and destruction of cetaceans has been a matter of concern for many years. The numbers captured are in the hundreds or even thousands annually worldwide. Cetaceans swim into nets, become entangled, and die because they cannot reach the surface to breathe. The problem is mostly associated with the use of gillnets, which are fished either on the bottom or the surface.

Fishing nets for commercial fisheries are conventionally made either from a single filament (monofilament) or several filaments (multifilament) woven together. The woven material is called a twine or web. Lines and weights and floats are then attached to the twine or web to meet the particular requirements of the net. The different styles of net are termed gillnet, trawl, seine, or weir, depending on the specific construction and use.

The term cetacean refers to mammals living in the world's oceans and rivers and includes various types of dolphins, porpoises, and whales. One characteristic of cetaceans is that they are able to echolocate, meaning they generate sound which radiates outward, and upon striking an object, is reflected back. The mammals use this device for locating food and navigating.

There are several theories regarding why cetaceans are captured in nets. One theory is that the nets are largely invisible to the cetaceans and they swim into them, even though they are echolocating, before they recognize their presence. Yet another theory says that they can identify the presence of the nets but they do not recognize them as something posing a threat. Another theory to account for cetacean capture is the animals swim into the nets because they are not using their echolocation system at the time of their capture.

Several approaches have been taken to end the capture of cetaceans. A concept that has been undergoing evaluation at several sites around the world is to use sound as a way of keeping cetaceans out of nets. A series of pingers are placed at regular intervals along the nets. Pingers are mechanical devices that emit sound, alerting cetaceans. Studies over the years have shown them to be effective in reducing cetacean capture.

There are several problems with the pingers, however. They are relatively costly and would increase significantly the cost of fishing. Furthermore, the pingers are battery powered and the batteries must be changed periodically, which is not a trivial matter since the pingers must be built so that they will not leak. Also, pinger failure leaves portions of the net unprotected. Finally, there is the problem that the pingers are intrusive in the environment because they are effective by making noise in the environment. There are concerns regarding whether migratory patterns of cetaceans might be altered as a result of the use of pingers.

In U.S. Pat. No. 5,349,774, the sound of feeding killer whales is played on a transducer under water in the vicinity of a mixed school of dolphin and tuna to selectively repulse the dolphin. In U.S. Pat. Nos. 5,251,187 and 5,117,572, an apparatus for steering the dolphins away from tuna is described, which also uses the sound of feeding killer whales.

There is a very sparse record of attempts to identify a passive system that would avoid the capture of cetaceans. A passive system is one in which there is no sound, light, smell or taste that impinges into the environment to provide a means of preventing cetacean capture.

Japanese application (JP 52009067) discloses making a pressure-resistant foamed material containing epoxy resin and used in floats for fishing nets. The intent was to alter the acoustic reflectivity of the floats to facilitate their detection by the mothership, not to solve the problem of capture of cetaceans. Studies of cetaceans in captivity have shown that they can detect large metal objects with their echolocation system.

The academic community is involved with the problem of cetacean capture, and the development of passive systems. One of the approaches to come from this sector is to weave a hollow core monofilament periodically into the net. Gillnets equipped with hollow core monofilament were tested alongside standard monofilament in a salmon mothership fishery, and it was found that there was no measurable drop in the rate of cetacean capture (W. W. Au and L. Jones, *Mar. Mamm. Sci.*, 1991, vol 7, no 3, pp. 258–273; D. Hembree and M. B. Harwood report (*Rep. Int. Whal. Commn.* 37, 1987, pp. 369–373).

Hembree and Harwood disclose fishing for 126 sets using a 500 m net with 150 m of bead chain looped at 8 m. A similar net was modified with 56 m of 6 mm airfilled plastic tubing. Trials using commercial gillnet vessels established that neither the bead chain nor the plastic tubing had a significant impact on the dolphin by-catch.

Because of the failure of all of these approaches, one published position is that the only solution is to close certain areas of water to gillnetting (S. M. Dawson, *Mar. Mamm., Sci.*, 7(3), pp. 274282, 1991). There have been several closures to gillnetting of waters within the Gulf of Maine every year. These closures cause great financial hardship to commercial fishermen, because it restricts severely the number of days they can fish over the course of a year.

The fundamental assumption being made in all of these potential solutions is that the net itself is not changed. Standard netting is modified by attaching materials to it. These materials include pingers or pieces of chain or hollow-core plastics, but the material used to make the net itself is not addressed. What has been lacking is an approach that would allow the net itself to be changed into a more reflective material, especially to frequencies detected by members of the cetacean family.

The inventors have discovered materials which, when incorporated into a monofilament, render the monofilament more acoustically reflective at frequencies used by cetaceans, at least in the 40–230 kHz range. By making the entire net more reflective, the net becomes more visible to cetaceans.

There are no prior examples of fabricated thermoplastic resin compositions that demonstrate acoustic reflectivities above the intrinsic reflectivity of the polymer of the thermoplastic material. Indeed, the concept of making and/or using a thermoplastic material with enhanced acoustic reflectivity is without precedent.

The acoustic reflectivity of an object can be measured by using a transmitter to send a signal directed at the target, then measuring the intensity of the signal returned. For a complete explanation of the experimental aspects see a report entitled, "Monofilament Gill Net Acoustic Study", by Elbert A. Pence, National Mammal Laboratory, Contract 40-ABNF-5-1988, which is incorporated herein by reference in its entirety. The target size of any object, according to Pence, is comprised of two factors, the geometrical target size and the impedance mismatch. Mr. Pence also reports on a series of tests on nylon monofilament and metal wire, determining that the metal wire was significantly more reflective of the signals. There is no example of prior art in which substances were added to a thermoplastic material to enhance acoustic reflectivity.

Adding substances to plastics is normal practice in the commercial art. These substances are added to reduce the cost of the finished product, to increase stiffness, or improve wear properties, for example. A general reference is J. Milewski, *Handbook of Fillers and Reinforcements for Plastics*, Van Nostrand Reinhold, New York, 1978, p. 66, which is incorporated herein by reference in its entirety.

SUMMARY OF THE INVENTION

The present invention is concerned with increasing the acoustic reflectivity of a thermoplastic resin, and more particularly with increasing its acoustic reflectivity by placing various acoustically reflective additives in a polymeric matrix of the thermoplastic resin, wherein the additives change the reflectivity of the products produced from the polymeric matrix by several decibels (dB). The instant invention is also concerned with providing polymeric compositions that can be used in forming acoustically reflective fishing nets, and carrying out fishing methods by using the acoustically reflective fishing nets of the present invention.

DETAILED DESCRIPTION OF THE PREFERRED EMBODIMENTS

Figure 1:
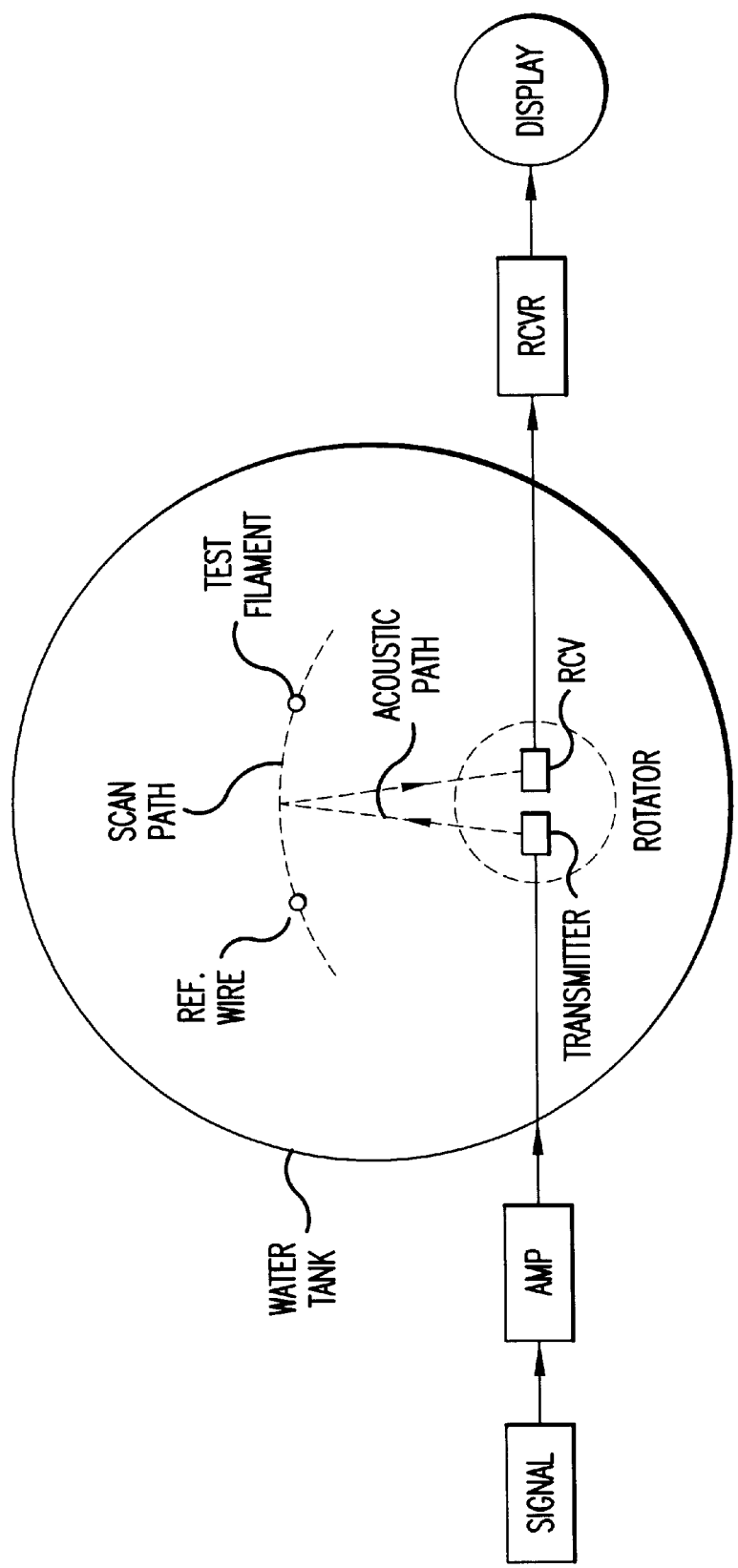
FIG. 1—A diagrammatic view of the test setup used to determine the reflectivity of a test filament in Examples 1 and 3.

The instant invention is directed to making a multifilament or a monofilament that is acoustically reflective in the range of 5–1,000 kHz, preferably 5–800 kHz, more preferably 5–500 kHz, more preferably 10–400 kHz, more preferably 20–300 kHz, more preferably 30–300 kHz, more preferably 30–250 kHz, more preferably 40–230 kHz, more preferably 50–230 kHz, still more preferably 75–200 kHz, and most preferably in the range of 120–140 kHz. The material used for making a fishing net can be any thermoplastic resin composition that may be melted and shaped into a multifilament or a monofilament with sufficient strength to be attractive for forming the fishing net. The thermoplastic composition may be any used for commercial fishing, such as a polyamide, preferably nylon 6 or nylon 6/6. Other thermoplastic resins used in netting include a polyester, such as polyethyleneterephthalate, or any polyolefin, including polyethylene or polypropylene.

Polyamides are preferred because these are the main thermoplastic materials that are conventionally used in making nets. Normally, the polyamide used in netting is nylon 6. Other nylons can be used as well, preferably nylon 6/6, or nylon 6/10. The most preferred are nylon 6 or nylon 6/6 because of their low cost and high strength.

The thermoplastic resin composition contains 70 to 97 parts by weight of a thermoplastic resin.

The additives or fillers that are blended in the polymer matrix of the thermoplastic resin include any material with a density of greater than about 3.0 g/cc, as listed in, for example, the "CRC Handbook of Chemistry and Physics", 73 ed., 1992–1993, CRC Press, Inc., which is incorporated herein by reference in its entirety.

Examples include compounds such as barium sulfate, iron oxide, lead oxide, barium carbonate, magnetite, aluminum oxide, magnesium oxide, titanium dioxide, zinc oxide, lithopone, or zinc sulfide. Elements such as iron, zinc, copper or lead also could be used. Alloys such as brass, bronze, or steel could be used. These materials are ground into very fine particles before mixing into a monofilament or a multifilament so that the monofilament or the multifilament has sufficient strength to perform adequately as a fishing net.

The preferred additive or filler used as a reflective material in this invention is one with a density of greater than about 3.0 g/cc as stated above. More preferred is barium sulfate, also known in mineral form by the name "barytes". The reflected signal, especially in the 120–140 kHz range is unexpectedly higher for some mixtures of barytes than would be predicted by the theory described in "Monofilament Gill Net Acoustic Study", by Elbert A. Pence, National Mammal Laboratory, Contract 40-ABNF-5-1988.

The additives or fillers are mixed with the thermoplastic resin and fabricated into a multifilament or a monofilament. The mixing can be carried out by using an extruder. In the extruder the thermoplastic resin is melted and the additive is dispersed in the melt. The extruded melt is drawn into a monofilament or a multifilament by known methods. The weight of the acoustically reflective additive or filler may be between about 3–30% by weight of the thermoplastic resin, or the produced resin product.

If the acoustically reflective additive is lower than 3% by weight of the thermoplastic resin, there is little difference in acoustic reflectance. If the additive is greater than 30% then there is sufficient loss of strength and flexibility in the monofilament or the multifilament, such that it is no longer attractive for making a fishing net.

Individual polymers vary in the amount of additive that can be blended without substantial loss of strength. Nylon 6, for example, does not accept more than 15% additive without significant loss of strength. At 12.5% barytes in nylon 6, a loss of about 10% in the stress-to-break is seen in making a 0.60 mm monofilament. When additives are present, it may be necessary for some combinations to use a slightly greater diameter monofilament to compensate for strength losses resulting from addition of the acoustically reflective material. Using a larger diameter monofilament will be an advantage in terms of acoustic reflectance.

The polymeric matrix of the thermoplastic resin contains from about 3% to about 30% by weight of acoustically reflective additive in the thermoplastic resin mixture. Preferably, the polymeric matrix of the thermoplastic resin contains from about 5% to 25% by weight, more preferably, 6% to 18% by weight, and even more preferably from about 8% to 15% of the acoustically reflective additive.

The thermoplastic resin composition of the present invention, as well as the fishing net comprising the thermoplastic resin composition, exhibits a 1 to 25 decibel (dB) improvement in acoustic reflectance, compared with unfilled thermoplastic resin, preferably 1 to 15 dB, more preferably 4 to 15 dB, and most preferably 6 to 13 dB, as measured by Pence's method, "Monofilament Gill Net Acoustic Study", by Elbert A. Pence, National Mammal Laboratory, Contract 40-ABNF-5-1988, which is incorporated herein by reference in its entirety.

A fishing net of the instant invention is not limited to a gillnet fishing net, but encompasses any fishing net in which an accidental entangling or entrapment of a cetacean is prevented, for example, a trawl, seine or weir net.

The following Examples are provided as an aid to those desiring to practice the present invention. They are not to be construed as limiting the instant invention, as set forth in the claims appended hereto, or the equivalents encompassed thereby.

EXAMPLE 1

Reflectance from a Flat Surface (Plaques)

Nylon 6 was melt blended with zinc dust or barytes. The blends were injection molded to prepare the sample target material. The density of barytes is approximately 4.1 g/cc and that for zinc dust is approximately 7.0 g/cc.

Several frequencies were used to evaluate the sample target material. Since the Dall's porpoise echolocates in the range 100–200 kHz, a frequency of 150 kHz was used in the study. Equipment included a pair of narrowbeam (−6) transducers with high acoustic efficiency (>50%) and exceptionally low side lobes (ca −30 dB). With this equipment it was possible to measure target strengths as low as −70 dB.

The sample plaque material measured 3"×2"×⅛" and were mounted so that the signal could be reflected off the 3"×2" surface. The samples were evaluated at a distance of 1 meter. The measurements were taken by slowly moving the transducer assembly across the face of the samples and recording the echoes as the transducer beams swept by. The reading at the highest reflection was recorded. The results are recorded in Table 1 below.

TABLE 1

Comparative Target Strengths of Flat Surfaces with Fillers in Nylon 6

| Sample | Filler | % | Improved Target Strength, dB |
|---|---|---|---|
| 1 | — | — | 0.0 |
| 2 | Zn | 5.0 | 1.7 |
| 3 | Zn | 10.0 | 2.6 |
| 4 | Zn | 15.0 | 5.0 |
| 5 | Barytes | 5.0 | 2.5 |
| 6 | Barytes | 7.5 | 3.2 |
| 7 | Barytes | 10.0 | 4.2 |
| 8 | Barytes | 15.0 | 5.8 |
| 9 | Barytes | 20.0 | 6.4 |
| 10 | Barytes | 25.0 | 7.0 |

EXAMPLE 2

Preparing Monofilament

A master batch was prepared by pre-mixing $BaSO_4$ and nylon 6 into a 30% $BaSO_4$ by weight sample, and extruding this material and pelletizing. The $BaSO_4$-rich pellets were mixed with nylon 6 to make mixtures which were either 10% or 12.5% $BaSO_4$. The blends were extruded using a standard monofilament commercial facility, making 0.60±0.05 mm diameter monofilament.

EXAMPLE 3

Reflectivity Tests of Modified Gillnet Monofilaments

To conduct the tests, a #23 copper wire (dia=0.0223 in.) was used as a reflection standard. The tests were conducted as shown in FIG. 1. Two pairs of transducers were used. The upper pair operates from 200 to 250 kHz. The lower pair operates from 100 to 150 kHz. Harbor porpoise (Phocoena phocoena) echolocation frequency is approximately 125 to 135 kHz, depending on the individual and the family. With this hypothesis in mind, the reflectivity measurements were carried out over the broader frequency range provided by the dual transducer sets.

Figure 2:
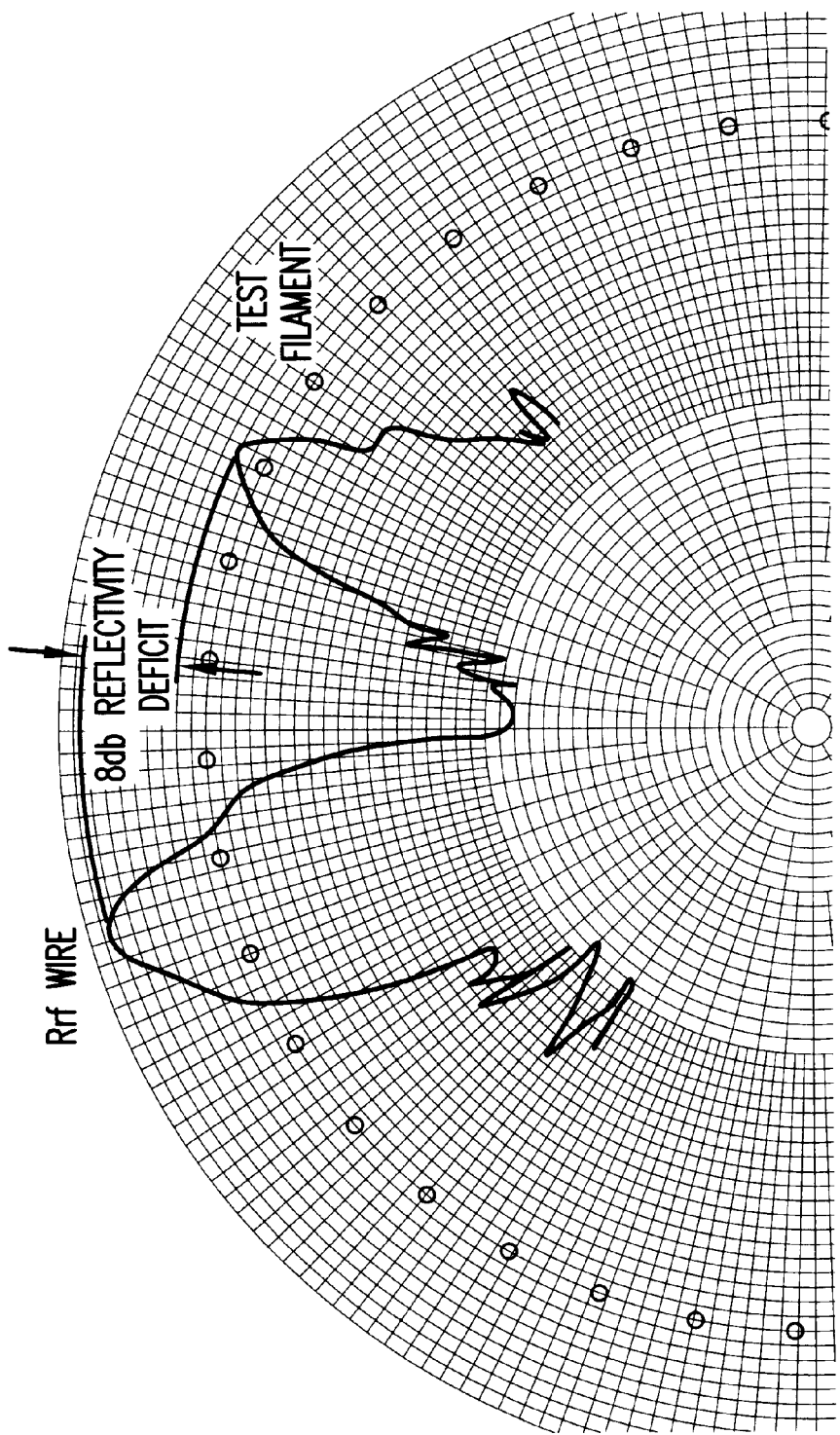
FIG. 2—Traces of the reflectivity data for a reference copper wire and a test filament, and the reflectivity deficit of the test filament with respect to the reference wire, as described in Example 3.

The transmitter drive was adjusted to bring the reflectivity return of the reference wire (as recorded by the Receiving transducer) near the top of the (linear) edge of the polar plot. The transducer array was then rotated to acquire reflectivity returns from the calibrating wire and the test monofilament in a single sequential sweep (frequently repeated with slight transmitter level adjustments to verify linearity and stability of the reflective returns). Several plots were made at various frequencies to acquire reflectivity versus frequency data. The plots were used to determine the reflectivity deficit of the test monofilament with respect to the reference copper wire. The reflectivity data obtained is recorded in Table II as the improvement in reflectivity over the non-filled standard. An example of a trace of the reflectivity data obtained for the reference copper wire, and the test filament, as well as the reflectivity deficit of the test filament with respect to the reference wire is recorded in FIG. 2.

TABLE II

Improved Reflectivity of 0.60 mm monofilament.

| Frequency, kHz | Nylon 6 No Barytes | 10.0% Barytes in nylon 6 | 12.5% Barytes in nylon 6 |
|---|---|---|---|
| 110 | 0.0 | 9.0 | 7.0 |
| 120 | 0.0 | 12.0 | 7.5 |
| 130 | 0.0 | 13.0 | 7.5 |
| 140 | 0.0 | 12.6 | 10.0 |
| 210 | 0.0 | 7.0 | — |
| 220 | 0.0 | 8.0 | — |
| 230 | 0.0 | 6.5 | — |

The higher the number, greater is the improvement in reflectivity. The monofilament with 10.0% Barytes displays highest reflectance, and approaches the reference value (−15 dB) of copper wire.

EXAMPLE 4

Fishing Nets

A master batch was prepared by pre-mixing $BaSO_4$ and nylon 6 into a 30% $BaSO_4$ by weight, and extruding this material and pelletizing. The $BaSO_4$-rich pellets were mixed with nylon 6 to make mixtures which were either 10% or 12.5% $BaSO_4$. These mixes were extruded on a standard monofilament extrusion line. The monofilament was 0.60+/− 0.05 mm in diameter. The monofilament was converted into webs for gillnets on a standard loom. Nets were fished in the Gulf of Maine and recorded "normal" fish catches and fewer mammal catches. The test was performed by fishermen out of Gloucester, Mass., in which standard net was fished alongside both 10.0% and 12.5% $BaSO_4$-filled nets. The results were self-reported by the fishermen. The test involved several miles of nets and over fifty "sets". Five white-sided dolphins were reported caught in standard nets, zero in the filled nets. Further tests were performed in the Bay of Fundy, Canada, in which observers were employed to record fish catches and cetacean captures. Again, the scale involved several miles of standard and $BaSO_4$-filled nets. Standard netting caught five harbor porpoises, whereas BaSO$_4$-filled net captured none. Fish catches for standard and BaSO$_4$-filled netting were equal or nearly equal.

The test net comprising nylon 6 with either 10.0% barytes or 12.5% barytes handled well in the net-hauling devices, and re-set as well or better than conventional netting. The test involved several miles of netting.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

All of the cited references cited in the specification are incorporated herein by reference in their entirety.

We claim:

1. A fishing net comprising an acoustically reflective monofilament comprising an acoustically reflective thermoplastic resin composition comprising a polymeric matrix, wherein said polymeric matrix is selected from the group consisting essentially of:
- (A) 70 to 97 parts by weight of a thermoplastic resin selected from the group consisting essentially of nylon 6 and nylon 6/6, and 3 to 30 parts by weight of one or more filler particles selected from the group consisting essentially of zinc, barium sulfate and iron oxide; and
- (B) 70 to 97 parts by weight of a thermoplastic resin consisting essentially of a polyolefin, and 3 to 30 parts by weight of one or more filler particles selected from the group consisting essentially of zinc and iron oxide.

2. The fishing net according to claim 1, wherein said polymeric matrix contains a polyolefin.

3. The fishing net according to claim 1, wherein said polymeric matrix contains nylon 6 or nylon 6/6.

4. The fishing net according to claim 1, wherein the polyolefin is polyethylene or polypropylene.

5. The fishing net according to claim 1, wherein the filler is zinc or iron oxide.

6. The fishing net according to claim 1, wherein the thermoplastic resin is a polyolefin, and the filler is iron oxide.

7. A method of avoiding the capture of unwanted cetaceans while fishing, comprising:

placing a fishing net comprising an acoustically reflective monofilament comprising an acoustically reflective thermoplastic resin composition comprising a polymeric matrix, into a body of water;

allowing fish to be caught in said net; and removing the net from the body of water, with said fish caught in the net, wherein said polymeric matrix is selected from the group consisting essentially of:
- (A) 70 to 97 parts by weight of a thermoplastic resin selected from the group consisting essentially of nylon 6 and nylon 6/6, and 3 to 30 parts by weight of one or more filler particles selected from the group consisting essentially of zinc, barium sulfate and iron oxide; and
- (B) 70 to 97 parts by weight of a thermoplastic resin consisting essentially of a polyolefin, and 3 to 30 parts by weight of one or more filler particles selected from the group consisting essentially of zinc and iron oxide.

8. The method of avoiding the capture of unwanted cetaceans while fishing according to claim 7, wherein the fishing net exhibits an acoustic reflectivity from 1 to 25 dB better than netting manufactured without filler.

9. A method of fishing, comprising:

placing a fishing net comprising an acoustically reflective monofilament comprising an acoustically reflective thermoplastic resin composition comprising a polymeric matrix, into a body of water;

allowing fish to be caught in said net; and removing the net from the body of water, with said fish caught in the net, wherein said polymeric matrix is selected from the group consisting essentially of:
- (A) 70 to 97 parts by weight of a thermoplastic resin selected from the group consisting essentially of nylon 6 and nylon 6/6, and 3 to 30 parts by weight of one or more filler particles selected from the group consisting essentially of zinc, barium sulfate and iron oxide; and
- (B) 70 to 97 parts by weight of a thermoplastic resin consisting essentially of a polyolefin, and 3 to 30 parts by weight of one or more filler particles selected from the group consisting essentially of zinc and iron oxide.

10. The method according to claim 9, wherein the thermoplastic resin is a polyolefin, and the filler is iron oxide.

* * * * *